US008813461B2

(12) United States Patent
Trier

(10) Patent No.: US 8,813,461 B2
(45) Date of Patent: Aug. 26, 2014

(54) METHODS OF PRODUCING A SYNTHETIC MATERIAL PART OF WHICH AT LEAST SECTIONS ARE LACQUERED, SYNTHETIC MATERIAL PART AND BASE BODY FOR THE PRODUCTION THEREOF

(75) Inventor: Martin Trier, Michelau (DE)

(73) Assignee: Kunststoff-Technik Scherer & Trier GmbH & Co. KG, Michelau (DE)

( * ) Notice: Subject to any disclaimer, the term of this patent is extended or adjusted under 35 U.S.C. 154(b) by 0 days.

(21) Appl. No.: 13/488,471

(22) Filed: Jun. 5, 2012

(65) Prior Publication Data

US 2012/0306227 A1   Dec. 6, 2012

(30) Foreign Application Priority Data

Jun. 6, 2011   (DE) .......................... 10 2011 076 959

(51) Int. Cl.
*C08J 7/04*     (2006.01)
*B05D 7/16*     (2006.01)
*B65B 23/00*    (2006.01)

(52) U.S. Cl.
CPC . *C08J 7/047* (2013.01); *B05D 7/16* (2013.01); *B65D 2585/6882* (2013.01); *B65D 2585/6887* (2013.01); *B65B 23/00* (2013.01)
USPC ................................. 53/428; 53/443; 53/472

(58) Field of Classification Search
CPC .............. B05D 7/16; C08J 7/047; C08J 7/04; B65D 2585/6882; B65D 2585/6887
USPC ........ 53/411, 428, 435, 443, 447, 472, 131.1, 53/542
IPC ....................................... B05D 7/16; C08J 7/04
See application file for complete search history.

(56) References Cited

U.S. PATENT DOCUMENTS

| 2,020,255 | A | * | 11/1935 | Copeman ....................... 428/440 |
| 2,487,255 | A | * | 11/1949 | Mabonsy ....................... 427/155 |
| 2,540,996 | A | * | 2/1951  | Ryden ............................ 524/525 |
| 3,235,954 | A | * | 2/1966  | Fromson ....................... 228/148 |
| 3,744,647 | A | * | 7/1973  | Jelinek .......................... 211/175 |
| 4,777,783 | A | * | 10/1988 | Zald ................................ 53/447 |
| 4,976,092 | A | * | 12/1990 | Shuert ............................ 53/475 |

(Continued)

FOREIGN PATENT DOCUMENTS

| DE | 4441688 A1       | 5/1996  |         |
| DE | 19829081 A1      | 1/2000  |         |
| DE | 102007011070 A1  | 9/2008  |         |
| DE | 102008022224 A1  | 11/2009 |         |
| DE | 102009008218 A1 * | 8/2010 | ..... B65D 2585/6887 |

(Continued)

OTHER PUBLICATIONS

"Lacquer" definition, Google search, retrieved Sep. 17, 2013, 1 page.*

(Continued)

*Primary Examiner* — Stephen F Gerrity
(74) *Attorney, Agent, or Firm* — Manelli Selter PLLC; Edward J. Stemberger

(57) ABSTRACT

Methods of producing a synthetic material part are provided, of which at least sections are lacquered and which include a base body which contains a synthetic material, in particular for a motor vehicle. A first method includes the steps of extruding the synthetic material to produce the base body; lacquering at least sections of the base body; and packaging the base body. The sections that are lacquered can be transported or shipped without being damaged.

10 Claims, 3 Drawing Sheets

(56) References Cited

U.S. PATENT DOCUMENTS

| | | | | |
|---|---|---|---|---|
| 5,390,474 | A | * | 2/1995 | Goggins .................. 53/467 |
| 5,644,898 | A | * | 7/1997 | Shepherd et al. ............. 53/445 |
| 6,235,358 | B1 | | 5/2001 | Goto |
| 6,769,230 | B2 | * | 8/2004 | Handa et al. ................. 53/461 |
| 7,665,280 | B2 | * | 2/2010 | Youell, Jr. et al. ............ 53/472 |
| 2003/0207985 | A1 | * | 11/2003 | Anderson et al. ............ 524/588 |
| 2003/0209504 | A1 | * | 11/2003 | Cook et al. .................. 211/13.1 |
| 2003/0212199 | A1 | * | 11/2003 | Anderson et al. ............ 524/588 |
| 2004/0209101 | A1 | * | 10/2004 | Dressler et al. .............. 428/521 |
| 2006/0258765 | A1 | * | 11/2006 | Ramsey ...................... 522/71 |
| 2007/0066739 | A1 | * | 3/2007 | Odle et al. ................... 524/430 |
| 2011/0052856 | A1 | | 3/2011 | Berthold |

FOREIGN PATENT DOCUMENTS

| | | | |
|---|---|---|---|
| EP | 1503030 A2 | 2/2005 | |
| JP | 59179626 A | 10/1984 | |
| WO | 2009090066 A1 | 7/2009 | |
| WO | WO 2009090066 A1 * | 7/2009 | ............ B60R 13/02 |

OTHER PUBLICATIONS

EPO machine translation of DE 102008022224, retrieved Sep. 17, 2013, 5 pages.*

European Search Report and Opinion in EP 12170713 dated Nov. 20, 2012, 5 pages.

Office Action in Corresponding German Application No. 102011076959.5, Jan. 24, 2012, 5 pages.

\* cited by examiner

METHODS OF PRODUCING A SYNTHETIC MATERIAL PART OF WHICH AT LEAST SECTIONS ARE LACQUERED, SYNTHETIC MATERIAL PART AND BASE BODY FOR THE PRODUCTION THEREOF

CROSS REFERENCE TO RELATED APPLICATIONS

This application claims the benefit of German patent application No. 10 2011 076 959.5, filed Jun. 6, 2011, the entire disclosure of which is herein incorporated by reference.

FIELD OF THE INVENTION

The present invention relates to methods of producing a synthetic material part of which at least sections are lacquered. The invention also relates to a synthetic material part of which at least sections are lacquered and which is produced in accordance with this type of method, and to a base body for the production of a synthetic material part of which at least sections are lacquered.

BACKGROUND OF THE INVENTION

Although the present invention can be used on the most varied synthetic material parts for decorative, cladding or covering purposes, e.g. in the field of automotive technology, it can also be used in other technical fields such as e.g. fitting out all types of road or rail-borne vehicles, aircraft and buildings, the invention and the problem forming the basis thereof will be explained in greater detail hereinafter with reference to a roof trim for a motor vehicle and the production thereof, but without restricting the invention to that effect.

Nowadays, roof trims are used in order to cover and seal a joint between a roof sheet and a sidewall sheet of a body of a motor vehicle, in particular a car. The external appearance of the vehicle should often also be improved by this. However, roof trims of this type are often not manufactured by the car manufacturer itself, but instead are produced by suppliers, delivered and then installed at one of the car manufacturer's plants. In the automotive industry, essentially identical vehicles or vehicle classes are often manufactured at different car plants which may be located on different continents. In order to ensure an identical level of quality at all car plants, generally the same suppliers are contracted to supply specific parts, in particular for roof trims. At the same time, it is mostly a wish on the part of the car manufacturers to achieve a high local content, i.e. the highest possible proportion of total value generated locally in the vicinity of the car plant.

It is also known that nowadays car buyers and users on the one hand place emphasis upon a high-quality and aesthetic appearance of the vehicle, but on the other hand consider low fuel consumption of the vehicle to also be important. By means of the at least partial production of decorative, covering or cladding parts, such as roof trims, consisting of synthetic materials, it is possible to achieve a reduction in the vehicle weight and thereby also a favourable effect upon fuel consumption.

Depending on the respective body shape, a roof trim can constitute a bulky component which is difficult to handle, by reason of its length and a curvature which follows the body shape. However, since high demands are placed upon the dimensional accuracy and the surface quality by reason of the fact that such strips are visible, a great deal of expenditure is required for the transportation or shipping of finished roof trims from the supplier to the car manufacturer, in order to avoid deformation of the roof trims under their own weight and the effects of other forces, scratching and the like. The length and curved shape of the roof trims require complex transport elements which prevent the individual strips from coming into contact with one another. Finished roof trims therefore cannot be closely packed. Expensive transport elements for supporting the roof trims during transportation and under certain circumstances costly packaging material, and the low loading density on account of only low utilisation of the loading volume result in an unfavourable increase in transport costs.

This is a situation which needs to be improved.

SUMMARY OF THE INVENTION

Against this background, an aspect of the present invention is to avoid the aforementioned disadvantages in the provision of high-quality, dimensionally accurate synthetic material parts and to reduce the arising transport costs, without having to accept reductions in the quality of the synthetic material parts.

In accordance with the invention, this aspect is achieved by a method of producing a synthetic material part, of which at least sections are lacquered, by a method of producing a synthetic material part, of which at least sections are lacquered, by a synthetic material part, of which at least sections are lacquered, and/or by a base body for the production of a synthetic material part, of which at least sections are lacquered.

Accordingly, a first method of producing a synthetic material part, of which at least sections are lacquered and which comprises a base body which contains a synthetic material, is provided which comprises the following method steps:
 the synthetic material is extruded in order to produce the base body;
 at least sections of the base body are lacquered; and
 the base body, of which at least sections are lacquered, is packaged in such a manner that the base body, of which at least sections are lacquered, can be transported or shipped without being damaged.

In this case, the synthetic material part, of which at least sections are lacquered, is intended in particular for use in a motor vehicle.

Furthermore, in accordance with the invention a second method of producing a synthetic material part, of which at least sections are lacquered, is provided. The synthetic material part comprises a base body, which contains a synthetic material, and is provided in particular for a motor vehicle. The second method in accordance with the invention comprises the following steps:
 the synthetic material is extruded in order to produce the base body;
 at least sections of the base body are lacquered; and
 the base body, of which at least sections are lacquered, is stretch-bent, in order to form the synthetic material part of which at least sections are lacquered.

Also provided is a synthetic material part, of which at least sections are lacquered and which is produced by means of a first method of this type or a second method of this type.

Furthermore, in accordance with the invention there is proposed a stretch-bendable base body for the production of a synthetic material part, of which at least sections are lacquered, in particular for a motor vehicle. The stretch-bendable base body comprises a synthetic material which is formed by extrusion. Furthermore, at least sections of the stretch-bendable base body are lacquered.

The idea forming the basis of the present invention consists of initially lacquering the base body, which is manufactured with the aid of an extrusion method, for the synthetic material part prior to further shaping, for which it is provided, in particular shaping by means of stretch-bending. The extrusion and lacquering can be performed e.g. at a supplier's premises. The base body, of which at least sections are lacquered, can be packaged, transported or shipped at considerably less expense than the finished synthetic material part. The base body, of which at least sections are lacquered, can also be temporarily stored in a more convenient manner than the finished synthetic material part. Costly elements, which are required for transportation, shipping or for temporary storage of finished synthetic material parts, in order to prevent mutual contact and unacceptable tensile, compressive or bending loads during transportation, shipping or storage which could lead to plastic deformation of the finished synthetic material parts and could thus impair the dimensional accuracy thereof, are not required when the methods in accordance with the invention are used. Transport and/or temporary storage are thus considerably simplified and rendered cheaper in each case by the first and second methods in accordance with the invention. The lacquering which serves to protect the surface of the base body and gives the synthetic material part to be produced a high-quality appearance can be effected in a cost-effective and economical manner at the supplier's premises. By reason of the transportation and temporary storage characteristics which are greatly improved in accordance with the invention, the supplier can supply his parts at a constantly high level of quality irrespective of location, in that he extrudes and lacquers e.g. all of the base bodies at one production site. In particular, all of the base bodies can be lacquered in the same lacquering installation. In accordance with the invention, the supplier therefore does not have to provide any lacquering capacity at the location to be supplied.

Advantageous embodiments and developments are apparent from the further subordinate claims and from the description with reference to the Figure of the drawing.

In accordance with one embodiment of the first method in accordance with the invention, during packaging the base body, of which at least sections are lacquered, is packed together with further base bodies of which at least sections are lacquered. Since the base bodies, of which at least sections are lacquered, still do not comprise the final shape of the synthetic material part to be produced, and because costly, complicated and bulky devices for holding and supporting the products being transported can be omitted, it is possible to pack a number of base bodies, of which at least sections are lacquered, closely together and to improve the loading density considerably during transportation. This leads to a considerable reduction in the transport costs per unit. For example, the base bodies, of which at least sections are lacquered, can be closely packed such that they can be stacked one next to the other and/or one on top of the other in a simple box or on a pallet without the use of any holding devices. It is sufficient to provide simple inserts, e.g. consisting of foamed material, bubble-wrap, cardboard or the like, between the base bodies, of which at least sections are lacquered, in order to provide at least sufficient spaced intervals therebetween and to avoid damage during transportation. Therefore, the packing density in comparison with conventional transportation of finished-formed synthetic material parts in a device for holding and supporting can be increased by 10 to 20 times, in particular by 12.5 to 17.5 times and preferably by 14 to 16 times.

In one embodiment, the packing density of the packaged base bodies, of which at least sections are lacquered, is 350 to 750 units/m$^3$, in particular 450 to 650 units/m$^3$. In one preferred embodiment, the packing density is between 500 and 600 units/m$^3$. Therefore, very close packing of the base bodies, of which at least sections are lacquered, and consequently extensive utilisation of the loading volume are ensured during transportation or shipping and/or temporary storage.

In a further embodiment of the first method in accordance with the invention, the base body, of which at least sections are lacquered, is transported or shipped and/or temporarily stored after packaging. As a result, the base body, of which at least sections are lacquered, can be transported from a supplier to a car manufacturer.

In accordance with a further improvement in the first method in accordance with the invention, the base body, of which at least sections are lacquered, is unpacked after transportation or shipping. In this case, the base body, of which at least sections are lacquered, is subsequently stretch-bent in order to form the synthetic material part of which at least sections are lacquered. The stretch-bending produces the intended final shape of the synthetic material part of which at least sections are lacquered. By virtue of the fact that the base body, of which at least sections are lacquered, is transported or shipped instead of the finished synthetic material part, and the shaping by stretch-bending is only effected after transportation or shipping and unpacking, transportation or shipping, as already described above, can be performed with less effort, more cost-effectively and in a more convenient manner. Therefore, e.g. the production step of stretch-bending, which causes the base body, of which at least sections are lacquered, to take up more space, can be effected in the vicinity of the respective car plant. As a result, the local content is increased. At the same time, additional lacquering capacity does not have to be made available because the base body, of which at least sections are lacquered, is already lacquered at least in sections, prior to being stretch-bent. Therefore, it is possible to achieve an identical level of surface quality at different car plants at different locations, without having to provide a lacquering facility for this purpose at each location.

In accordance with one embodiment of the second method in accordance with the invention, the base body, of which at least sections are lacquered, is transported or shipped prior to being stretch-bent. The process of stretch-bending which causes the base body, of which at least sections are lacquered, to take up more space, can thus be performed directly in the vicinity of the location to be supplied, in particular a car plant. This provides in turn the aforementioned advantages during transportation or shipping, in particular by reason of the considerably improved loading density and the saving on costly transport elements or expensive packaging materials. This also provides the already explained advantages of higher local content, the same high level of quality and the saving on lacquering facilities on site.

In one development of the method in accordance with the invention, the base body, of which at least sections are lacquered, is curved during stretch-bending such that a longitudinal direction of the synthetic material part, of which at least sections are lacquered, follows a two-dimensional or three-dimensional space curve. Specifically in the case of synthetic material parts which are curved in this manner, the above-described advantages of the methods in accordance with the invention have a particularly advantageous effect e.g. during transportation or shipping, since synthetic material parts which are curved in this manner require a great deal of expenditure in terms of handling, transportation and/or temporary storage.

In accordance with a further development of the methods in accordance with the invention, ends of the synthetic material part, of which at least sections are lacquered, are cut after stretch-bending, in order to provide the synthetic material part, of which at least sections are lacquered, with a predetermined length. Excess lengths on the ends of the stretch-bent synthetic material part can be removed thereby. In particular, at least sections of these excess lengths can also be lacquered, so that the point at which the synthetic material part is cut is not predetermined by the lacquering and can thus be provided in more flexible manner. Alternatively, at least sections of the ends of the base body can be omitted from the lacquering from the start, in order to minimise consumption of lacquer. Therefore, at least sections of the removed excess lengths are not lacquered.

In the case of a further advantageous embodiment of the methods in accordance with the invention, the base body is formed as an elongated profile such that a longitudinal direction of the base body extends substantially linearly. Base bodies, of which at least sections are lacquered and which are formed in this manner, can be temporarily stored or transported in a particularly effective and convenient manner and can be shipped with a high packing density. For example, the base bodies, of which at least sections are lacquered, can be closely packed in a particularly advantageous manner such that they can be stacked one next to the other and/or one on top of the other in a simple box or on a pallet without the use of any holding devices. Inserts consisting of conventional packaging materials, e.g. foamed material, bubble-wrap, cardboard or the like, can be provided between the base bodies, of which at least sections are lacquered. Therefore, the packing density in comparison with conventional transportation of finished-formed synthetic material parts in a device for holding and supporting can be increased by 10 to 20 times, in particular by 12.5 to 17.5 times and preferably by 14 to 16 times. This means that in relation to the volume, e.g. of the respective packaging unit, a number of units which is increased by these factors can be packaged, transported and/or shipped and/or temporarily stored. In one embodiment, the packing density of the at least elongated profiles in the packaging is 350 to 750 units/$m^3$, in particular 450 to 650 units/$m^3$. In one preferred embodiment, the packing density is in this case also between 500 and 600 units/$m^3$.

In one preferred embodiment of the methods in accordance with the invention, at least sections of the base body are lacquered using a lacquer which comprises a synthetic material from the group of polyurethanes. This gives the lacquering of the base body an elasticity which ensures that during subsequent stretch-bending of the base body, of which at least sections are lacquered, it is possible to avoid any flaking of the lacquer layer(s). Furthermore, it is thereby also possible to avoid discolourations and other visual flaws on the surface, in particular whitish discolourations, at locations which have undergone bending. Stretch-bending of the based body, of which at least sections are lacquered, can thus be performed without any deterioration in the quality of the surface of which at least sections are lacquered.

In one preferred embodiment, the base body can be lacquered using a lacquer system formed with two or more lacquer layers, wherein at least one of the lacquer layers contains polyurethane. Therefore, the lacquer is provided with the elasticity which offers the aforementioned advantages.

In the case of one embodiment of the stretch-bendable base body in accordance with the invention, the stretch-bendable base body is formed as an elongated profile, wherein a longitudinal direction of the stretch-bendable base body extends substantially linearly. Base bodies of this type can advantageously be packed tightly during transportation and storage and for this purpose do not require any costly devices or packaging.

In a further embodiment of the base body in accordance with the invention, the stretch-bendable base body is lacquered using a lacquer comprising a synthetic material from the group of polyurethanes. A base body of this type can be stretch-bent after being lacquered, without the lacquer flaking off or becoming discoloured.

In the case of one preferred embodiment of the invention, the synthetic material part, of which at least sections are lacquered, is formed as a roof trim, in particular for a car.

Within the scope of the present invention, the base body can be produced by extrusion from a single synthetic material, but e.g. also by co-extrusion of several strands of the same or different synthetic materials, or also by co-extrusion of one or several synthetic materials and a reinforcement which can be formed e.g. from metal. Within the scope of the present invention, the synthetic material part is to be understood to be a part which is formed with one or several synthetic materials and in which the presence of a metal reinforcement, which e.g. during extrusion is surrounded completely or partially by synthetic material, or of another reinforcement is not excluded.

The embodiments and developments above can be combined in any manner where expedient to do so. Further possible developments, implementations and embodiments of the invention also include combinations—which are not expressly stated—of features of the invention which are described heretofore or hereinafter in relation to the exemplified embodiments. The person skilled in the art will also add individual aspects as improvements or additions to the respective basic form of the present invention.

BRIEF DESCRIPTION OF THE DRAWINGS

The present invention will be explained in greater detail hereinafter with reference to the exemplified embodiment illustrated in the schematic Figure of the drawing, in which.

Figure 1:
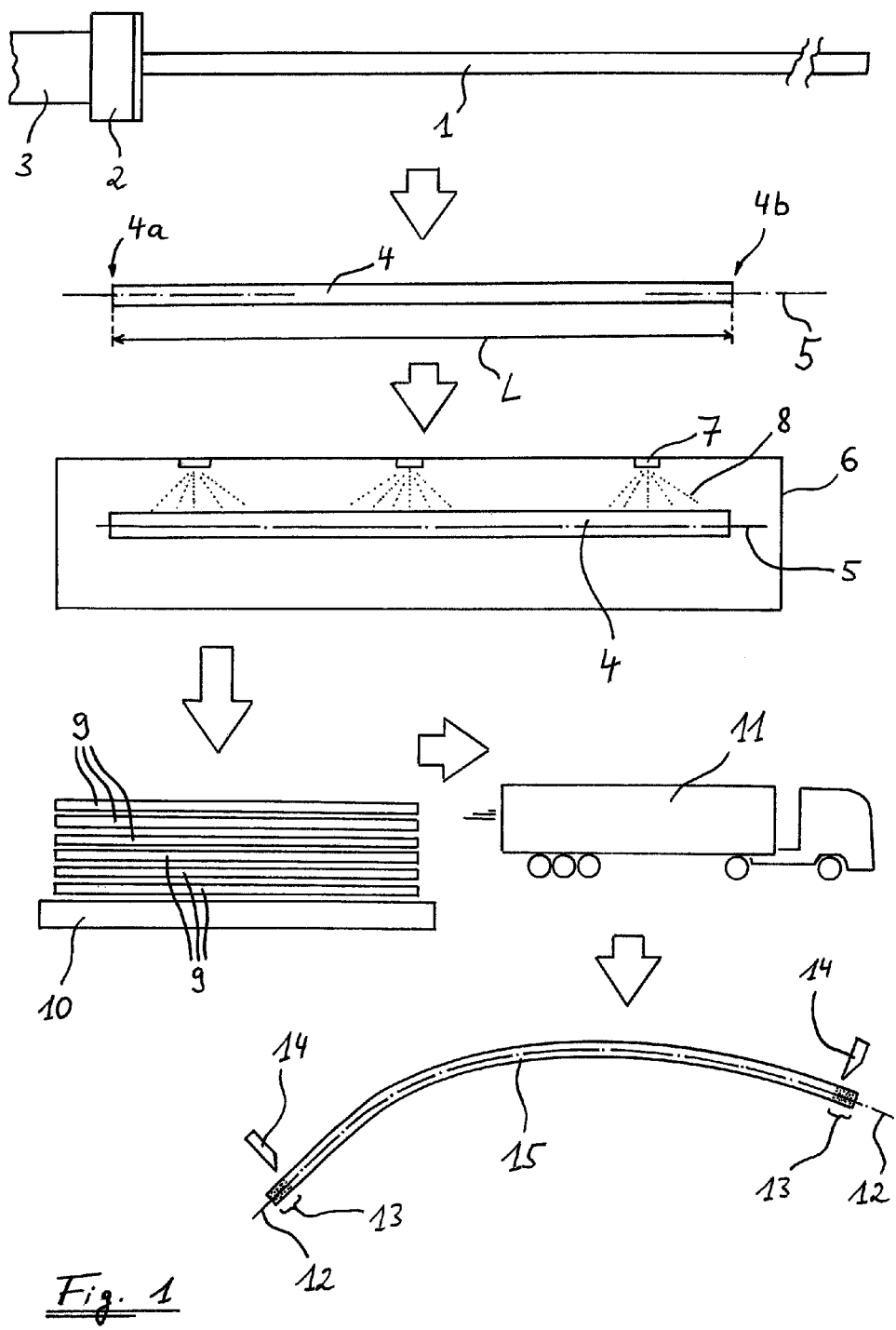
FIG. 1 shows a method of producing a synthetic material part, of which at least sections are lacquered, in accordance with one exemplified embodiment of the invention.

The accompanying drawings are intended to provide a better understanding of the embodiments of invention. They illustrate one embodiment and in combination with the description serve to explain principles and concepts of the invention. Other embodiments and many of the stated advantages are revealed in the drawings. In this case, the elements of the drawing are not necessarily illustrated to scale in relation to one another.

In the Figures of the drawing, elements, features and components which have an identical function or equivalent effect are each designated by the same reference numerals, unless otherwise stated.

DETAILED DESCRIPTION OF THE INVENTION

FIG. 1 illustrates the method steps of a method of producing a synthetic material part, of which at least sections are lacquered, in accordance with one exemplified embodiment of the invention.

In a first method step, a synthetic material, in particular a thermoplastic synthetic material, is extruded to form a strand 1 by means of an extrusion tool 2 and an extruder 3 which melts the synthetic material in a manner known per se and conveys it under pressure into the extrusion tool 2.

Then, by cutting the strand 1 to length, a base body 4 comprising two ends 4a and 4b is formed. The base body 4 is in the form of an elongated profile, wherein a longitudinal direction 5 of the base body 4 extends substantially linearly. Between its ends 4a and 4b, the base body 4 has a predetermine length L.

Subsequently, the elongated base body 4 which as before extends substantially linearly is lacquered e.g. in a lacquering apparatus 6, which is suitable for this purpose and is provided with devices 7 for applying a lacquer 8 to the base body 4. In the case of the exemplified embodiment illustrated in this case, the base body 4 is completely lacquered, but this is not absolutely necessary and it is also possible for only sections of the base body 4 to be lacquered. While lacquering, as schematically illustrated in FIG. 1, can be effected by atomisation of the lacquer 8, it is also possible in one variant for the base body 4 to be dip-lacquered.

During lacquering, one or several lacquer layers can be applied to the base body 4. At least one of the lacquer layers contains a substance from the group of polyurethanes, whereby the lacquer or lacquer system, with which the base body 4 is lacquered, acquires a certain amount of elasticity. For example, an aqueous polyurethane lacquer system can be used.

Even though for the sake of clarity this is not illustrated in FIG. 1, the base body 4 can still be prefabricated before being lacquered.

In accordance with the exemplified embodiment of FIG. 1, a desired number of base bodies 4 are extruded and lacquered in the manner described above. After the lacquer 8 or lacquer layers has hardened, each of the base bodies 4, together with the lacquer layer(s) applied to the entire surface or sections thereof, forms a stretch-bendable base body 9, of which at least sections are lacquered. The lacquered base bodies 9 are also in the form of elongated, linear profiles with the longitudinal direction 5 which, as illustrated by way of example in FIG. 1, can be tightly packed in a further method step in a convenient and advantageous manner, e.g. on a pallet 10, without in this case the base bodies 9, of which the whole surface or sections are lacquered, in particular the lacquered surface sections becoming damaged or undergoing unfavourable deformation. Subsequently, the lacquered base bodies 9 which, as illustrated, are closely and tightly packed can be shipped or transported at a high loading density and cost-effectively, e.g. by means of a commercial vehicle 11 or other suitable transport means. Preferably, the base bodies 9, of which at least sections are lacquered, are in this case packaged before being transported or shipped such that the base bodies 9 are not damaged during transportation or shipping. Owing to the simple, linear formation of the base bodies 9, costly holding or support devices are not required in this case, instead a simple, cost-effective packing material can be used.

The base bodies 4, 9 can be extruded, lacquered and packaged e.g. at a supplier's premises. Subsequently, the base bodies 9, of which the whole surface or at least sections are lacquered, can be transported as described to a motor vehicle manufacturer, e.g. a car manufacturer. In particular, the base bodies 9, of which the whole surface or at least sections are lacquered, can also be transported to different car plants, e.g. on different continents. The base bodies 9 are unpacked at the site of the car manufacturer, e.g. in the workshops thereof or in the immediate vicinity thereof, and are then subjected to stretch-bending. The stretch-bending process serves to stretch the base body 9, of which at least sections are lacquered, e.g. by ca. 2% of its length L, and serves to deform it, thus producing a synthetic material part 15. At least sections of the synthetic material part 15 are likewise lacquered. By selecting the lacquer 8 in the manner described above, the elasticity of the lacquer prevents the lacquer 8 or lacquer layers from flaking off or becoming discoloured during the stretch-bending procedure as a consequence of the stresses introduced into the component. By virtue of the fact that e.g. for all car plants the base bodies are lacquered beforehand at the same lacquering facility, it is possible at each car plant to ensure the same level of quality on the surfaces of the synthetic material parts. At the same time, the step of stretch-bending on site or in the vicinity of the car plant provides high local content. After stretch-bending, the synthetic material part 15 has a longitudinal direction 12 which follows a two-dimensional or also three-dimensional space curve.

The above-described length L of the base body 4 is selected to be sufficiently long to permit the stretch-bending procedure, in other words the base body 4 and thus also the base body 9, of which at least sections are lacquered, have a certain excess length. After stretch-bending, ends of the synthetic material part 15 can be cut in order to provide the synthetic material part 15 with its predetermined length. For this purpose, end portions 13 of the synthetic material part 15 can be cut off by means of suitable cutting or separating devices 14. At least sections of the end portions can also be lacquered. This ensures that the cutting-off of the end portions is independent of any end of the lacquering. Alternatively, sections of the end portions can also be omitted from the lacquering in order to minimise consumption of lacquer. Therefore, at least sections of the end portions which are cut off during the cutting procedure are not lacquered.

The synthetic material part 15 of FIG. 1, of which at least sections are lacquered, is preferably a roof trim for a car.

In one variant of the exemplified embodiment of the invention illustrated in FIG. 1, instead of transporting the base bodies 9, of which the entirety or sections are lacquered, e.g. by means of the sketched commercial vehicle 11 or other suitable transport means, it is also possible if desired to temporarily store the base bodies 9 of which at least sections are lacquered, wherein for this type of temporary storage costly holding and supporting devices and corresponding costly packaging can also be advantageously omitted.

Figure 2A:
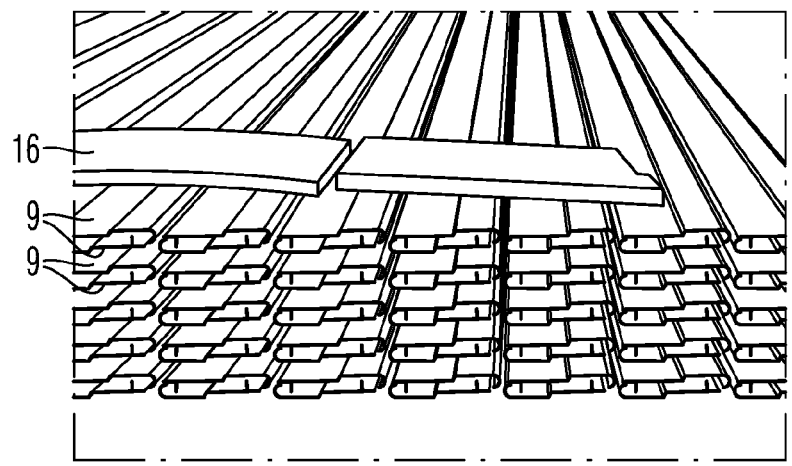
FIG. 2a shows an illustration of packaged, closely packed base bodies, of which at least sections are lacquered, in a first view from the front.
Figure 2B:
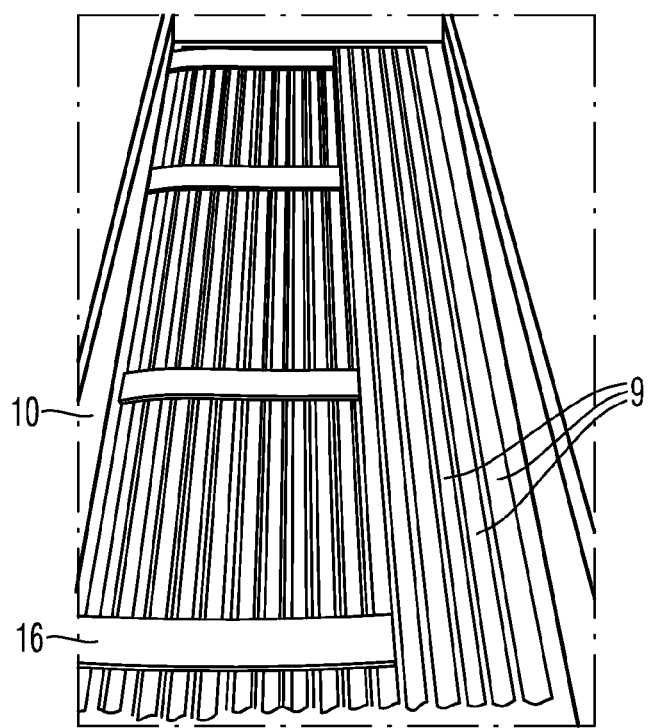
FIG. 2b shows the packaged, closely packed base bodies of FIG. 2a, of which at least sections are lacquered, in a second view from above.

FIGS. 2a and 2b show an illustration of packaged, closely packed base bodies, of which at least sections are lacquered. In this case, the lacquered base bodies 9 are also in the form of elongated, linear profiles which can be tightly packed in a convenient and advantageous manner on a pallet or in a box 10, without in this case the base bodies 9, of which the entirety or sections are lacquered, in particular the lacquered surface sections becoming damaged or undergoing unfavourable deformation. Subsequently, the lacquered base bodies 9 which are closely and tightly packed in the box can be shipped or transported cost-effectively with a high packing density. In the illustrated manner, the base bodies 9, of which at least sections are lacquered, are in this case packaged before being transported or shipped such that the base bodies 9 are not damaged during transportation or shipping. Owing to the simple, linear formation of the base bodies 9, it is possible for this purpose to use cost-effective packing material 16, e.g. inserts consisting of foamed material, bubble-wrap, cardboard or the like.

Figure 3:
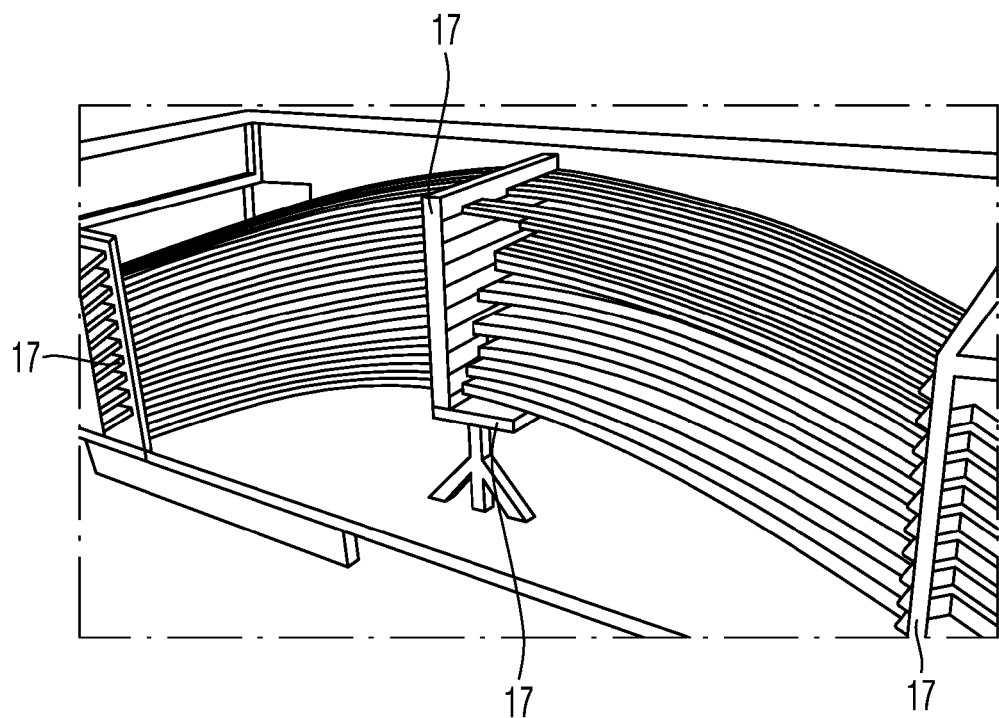
FIG. 3 shows an illustration of packaged, already bent synthetic material parts.

FIG. 3 shows an illustration of packaged, already bent synthetic material parts. This illustration shows the difference between a conventional method in terms of transportability, packing capability and in particular packing density compared to the method in accordance with the invention. In the case of the base bodies which are illustrated in FIGS. 2a and 2b, are packed in accordance with the invention and of which at least sections are lacquered, 1088 units of the base bodies, of which at least sections are lacquered, can be packed into a box 10 which e.g. has dimensions of 2500 mm×800 mm×1000 mm. The packing density is e.g. 544 units/m$^3$. However, in the case of the synthetic material parts which are illustrated in FIG. 3, have already been deformed and are packaged in a conventional manner, it is necessary to use a transport box which is provided specifically for this purpose. This type of transport box is provided with costly elements 17. The costly elements are required during transportation, shipping or temporary storage of finished synthetic material parts, in order to prevent mutual contact and unacceptable tensile, compressive or bending loads during transportation or storage, which could lead to plastic deformation of the finished synthetic material parts and could thus impair the dimensional accuracy thereof. The transport box illustrated in FIG. 3 has e.g. dimensions of 2800 mm×800 mm×1000 mm and can only hold 80 units of the synthetic material parts. The packing density is approximately 35.7 units/m$^3$. Therefore, the packing density differs approximately by a factor of 15.2. This means that a synthetic material part which is transported in the arrangement of FIG. 3 requires for safe transportation a loading volume which is greater by a factor of 15.2 compared to a packaged base body of FIG. 2a or 2b, of which at least sections are lacquered. The utilisation of the loading volume which is improved in accordance with the invention results in considerably lower transport costs. Moreover, simplified packaging can lead to simplified handling of the base bodies of which at least sections are lacquered.

Although the present invention has been fully described above with reference to the preferred exemplified embodiment, it is not limited thereto but rather can be modified in various ways.

The synthetic material part, of which at least sections are lacquered, can also be e.g. any other trim, covering or cladding strip for a motor vehicle, in particular for a car.

Furthermore, it is also feasible to use the above-described method for producing lacquered synthetic material parts which are to be utilised in other locomotive means or even in the cladding or decoration of building or other edifices.

What is claimed is:

1. A method of producing a synthetic material part, of which at least sections are lacquered and which comprises a base body which contains a synthetic material and which is provided for further shaping, comprising the steps of:
    extruding the synthetic material for producing the base body;
    lacquering at least sections of the base body;
    packaging the base body, of which at least sections are lacquered, for damage-free transport, shipping or temporary storage, wherein the base body is packed together with further base bodies, of which at least sections are lacquered;
    transporting, shipping or temporarily storing of the packaged base body, of which at least sections are lacquered;
    unpackaging of the base body, of which at least sections are lacquered; and
    shaping of the base body, of which at least sections are lacquered.

2. The method of claim 1,
    wherein during packaging the base body, of which at least sections are lacquered, is closely and tightly packed together with further base bodies, of which at least sections are lacquered.

3. The method of claim 2,
    wherein the packing density of the packaged base bodies, of which at least sections are lacquered, is 350 to 750 units/m$^3$.

4. The method of claim 3,
    wherein the packing density of the packaged base bodies, of which at least sections are lacquered, is 450 to 650 units/m$^3$.

5. The method of claim 4,
    wherein the packing density of the packaged base bodies, of which at least sections are lacquered, is 500 to 600 units/m$^3$.

6. The method of claim 1,
    wherein shaping of the base body, of which at least sections are lacquered, comprises stretch-bending.

7. The method of claim 6,
    wherein the base body, of which at least sections are lacquered, is curved during stretch-bending such that a longitudinal direction of the synthetic material part, of which at least sections are lacquered, follows a two-dimensional or three-dimensional space curve.

8. The method of claim 6,
    wherein ends of the synthetic material part, of which at least sections are lacquered, are cut after stretch-bending, in order to provide the synthetic material part, of which at least sections are lacquered, with a predetermined length.

9. The method of claim 1,
    wherein the base body is formed as an elongated profile such that a longitudinal direction of the base body extends substantially linearly.

10. The method of claim 1,
    wherein at least sections of the base body are lacquered using a lacquer which comprises a synthetic material from the group of polyurethanes.

* * * * *